(No Model.)
J. LISTER.
PIPE COUPLING.
No. 486,936. Patented Nov. 29, 1892.
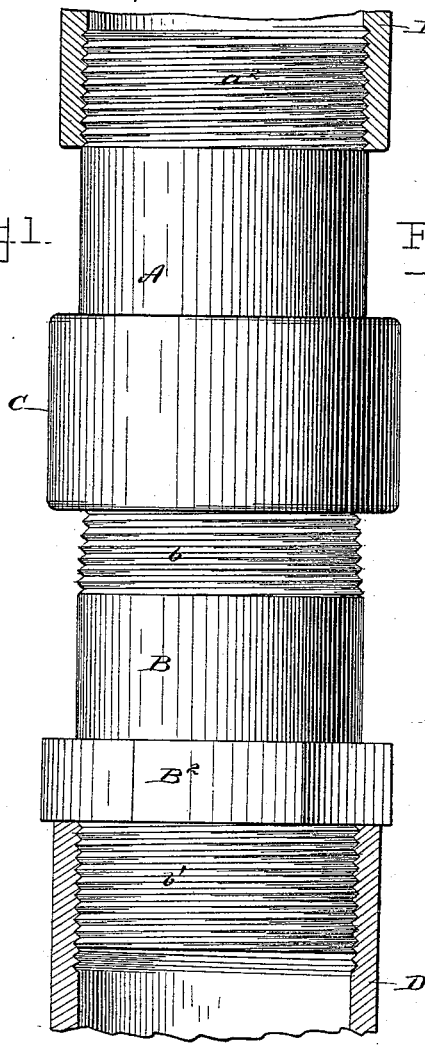
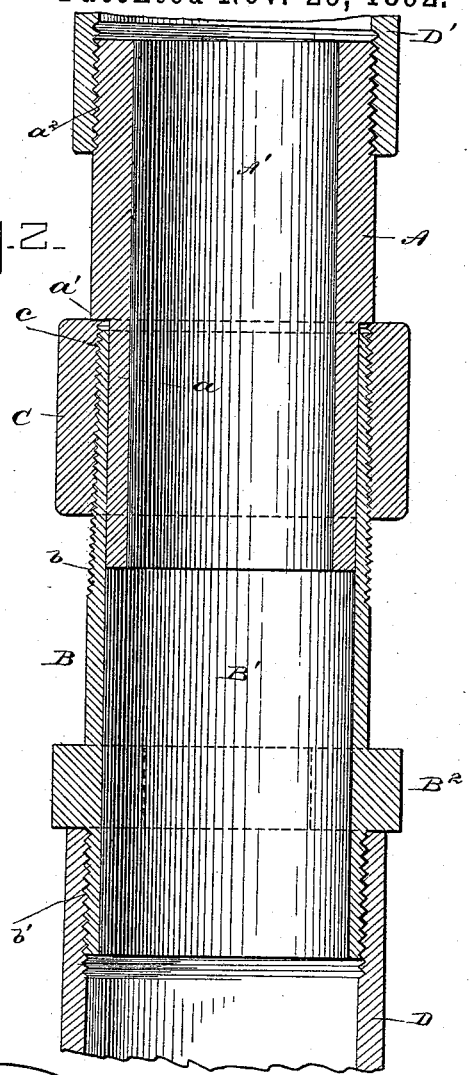
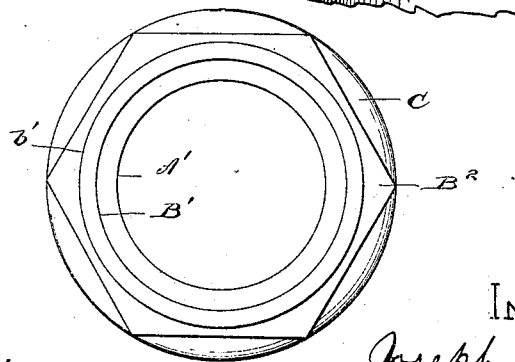
Witnesses:
E. K. Sturtevant.
M. B. May
Inventor:
Joseph Lister
by Doubleday & Bliss
attys

UNITED STATES PATENT OFFICE.

JOSEPH LISTER, OF CHICAGO, ILLINOIS.

PIPE-COUPLING.

SPECIFICATION forming part of Letters Patent No. 486,936, dated November 29, 1892.

Application filed December 21, 1891. Serial No. 415,754. (No model.)

*To all whom it may concern:*

Be it known that I, JOSEPH LISTER, a citizen of the United States, residing at Chicago, in the county of Cook and State of Illinois, have invented certain new and useful Improvements in Pipe-Couplings, of which the following is a specification, reference being had therein to the accompanying drawings.

Figure 1 is a side view of a coupling device embodying my improvements. Fig. 2 is a central longitudinal section. Fig. 3 is an end elevation.

I will first describe more or less in detail the features of construction and the manner of using that particular form of device which I have selected for the purpose of illustration in the drawings and will then call attention to some of the general features of the invention, from which it will be seen that it is not necessarily limited exactly to the details of the present construction.

The coupling shown comprises three main parts, respectively indicated by A B C. The parts A and B are adapted to be secured to the ends of sections of tubing or pipes, as at D D', and the parts of the coupling are so formed that the main tube or pipe sections can be all similar to each other. The part A is reduced upon its outer side, as shown at $a$, there being, preferably, a shoulder at $a'$ serving as a stop for the companion part of the coupling. At the opposite end this nipple A is provided with an external screw-thread $a^2$, whereby it is adapted to be attached to the interior of one end of a tube-section which it is desired to connect with another. The other nipple or part of the coupling B is formed with a screw-thread $b$ at one end, whereby it can be secured to the end of the section of tube or pipe D' which it is desired to couple to that at D. Adjacent to this threaded part there is a flange B' angular on its periphery, (preferably hexagonal,) whereby a tool can be readily applied for turning it. At the other end this nipple B has a cylindrical (or approximately cylindrical) interior of a diameter such that it can fit snugly to the part $a$ of the nipple A, although it can slide thereon more or less readily. On the outer surface of this end of the nipple B there is a tapering thread formed at $b$. The part C consists of a clamping-collar having a periphery of suitable shape and dimensions and having a tapering thread upon the interior adapted to engage with that at $b$ on the nipple B. When it is forcibly turned around said nipple, it will cause a compression to be exerted upon the end of the latter, as will be readily understood.

The manner of applying the parts which I have described will be seen from an examination of the drawings and the above description. When it is desired to couple two such tubes or pipe-sections as those at D D', the part A is inserted into the tube D and the part or nipple B into the tube D'. Then the reduced portion $a$ of the nipple A is inserted into the tapered end of the nipple B, and then the nut C is forcibly rotated until the metal of the nipple B is tightly compressed against that at $a$. After this has been done a joint is provided so tight that it will effectually resist any pressure which is ordinarily experienced in steam or hydraulic piping.

Preferably I make the part or nipple B of copper and the compressing or gripping collar C of steel. The latter insures that a powerful pressure can be exerted without danger of fracture, and the former material is capable of yielding to the pressure and contracting much more readily than the other ordinary metals used for making tubes or pipes.

Irrespective of the particular materials which are used for the construction of the parts described, it will be seen that the operation of coupling together two tube-sections can be quickly performed. The coupling act proper does not require the rotating or turning of either section of the tubing, their junction being effected by merely slipping one or both of the nipple parts A B longitudinally.

The telescopic connection of the nipples is of such sort that at any time I can instantly effect an uncoupling of the two pipe-sections as well as effect, whenever necessary, a rapid coupling of them together. The contiguous surfaces of the parts telescopically joined have not at any time any permanent or rigid connection with each other; but, being smooth, they can at any time if the binding-collar be loosened be slipped in either direction relatively to each other. One of the most important points of advantage in my invention is that the two telescoping parts can be as readily slipped apart as they can be put together without requiring the rotation of either.

I am aware that use has been made of a thimble or short tube having at its end an outwardly-expanding or cone-shaped enlargement with a conical screw-thread upon its surface, in combination with a lead pipe which is initially smooth-surfaced internally at the end and a conically-threaded nut adapted to rotate upon the outer surface of said end and crowd the lead inwardly over the aforesaid enlargement on the end of the threaded thimble, and I do not claim such a device as of my invention. In that case the purpose was to force the lead into the conical threads of the interior thimble, as well as bend the end edge of the lead pipe down behind the expanded end of the threaded thimble, so as to doubly provide for a practically-inseparable joining of the two pipes or tubes.

In my case the metal of neither of the telescoping parts is ever so bent as to present a stop or obstruction to prevent them from moving from or toward each other rectilinearly. I prefer, as aforesaid, a metal of the general character of copper for the exterior nipple for the reason that while being sufficiently yielding to permit the forming of a tight joint under compression it nevertheless has sufficient resiliency to insure that the two contiguous telescoping surfaces shall separate far enough (when the pressure of the collar is reduced) to allow the aforesaid rectilineal slipping.

I am aware of the fact that rubber or other flexible hose has been clamped to tubing or pipe by means of conically or taperingly threaded parts intended to force the rubber against the metal; but the present invention aims to provide a coupling adapted for use under circumstances where such tubing would not be available. I am also aware that pipes or tubes have been coupled by means of a metallic nipple or thimble engaging by an interior thread with exterior threads on the tubes or pipes and that a taperingly-threaded collar has been used to crowd the external thimble down upon the interior thread, and I do not claim any of the devices referred to as being my invention.

What I claim is—

1. A three-part pipe-coupling two of the parts of which are telescopically connected together and each being detachably connected to its respective pipe-section and adapted to be disconnected without detaching either of the pipe-sections and the third part surrounding and clamping together the telescopically-joined portions, substantially as set forth.

2. A pipe-coupling having two tubular nipples adapted to be respectively secured to the ends of two pipe-sections and having a loose sliding-joint connection with each other, in combination with an external collar with an internal tapering aperture, whereby it is adapted to force together the parts of the sliding joint, substantially as set forth.

3. A pipe-coupling having two tubes or nipples independent of the pipe-sections to be coupled and fitted together by a sliding or telescopic joint, the exterior part of said joint being tapered and provided with a tapering thread, in combination with a surrounding collar having an internal tapering thread corresponding to that aforesaid, substantially as set forth.

4. The herein-described pipe-coupling, having the tube or nipple formed of copper and adapted to be detachably connected to a section of pipe and adapted to be connected to and disconnected from an adjacent pipe-section by a sliding-joint without removing the first aforesaid pipe-section, in combination with an exterior clamp or collar formed of steel, said collar having an interior tapering thread corresponding to an exterior thread on the copper nipple, substantially as set forth.

5. A pipe-coupling device consisting of a nipple A, having a reduced portion and detachably secured to one of two pipe-sections to be coupled, a nipple B, detachably secured to the other of said pipe-sections, sliding loosely on said reduced portion of nipple A and having an exterior tapering thread, and a collar having an interior tapering thread and adapted to be screwed on said nipple B, whereby said nipples A and B are clamped together, substantially as set forth.

6. In a pipe-coupling, the combination of the pipe D, the pipe D', the nipple A, detachably connected to the pipe D' and having at its end a permanently-smooth exterior surface, the nipple B, detachably connected to the pipe D and having a permanently-smooth interior surface fitting the exterior surface on nipple A and having an expanded exterior surface, and means, substantially as set forth, movable longitudinally on said expanded surface to crowd the nipple B against the nipple A, as described.

7. The combination, with a pipe or tube having an external tapering thread and an adjacent pipe telescopically connected therewith, whereby it is adapted to slip longitudinally in the aforesaid pipe both after and before a coupling, of a binding-collar having an interior tapering thread corresponding to the tapering thread on the first aforesaid pipe, said collar surrounding and clamping tightly together said telescopically-connected pipes, substantially as set forth.

In testimony whereof I affix my signature in presence of two witnesses.

JOSEPH LISTER.

Witnesses:
E. RAYMOND BLISS,
L. W. POST.